United States Patent
Humeau et al.

(10) Patent No.: US 12,539,268 B2
(45) Date of Patent: Feb. 3, 2026

(54) COSMETIC COMPOSITION

(71) Applicant: GIVAUDAN SA, Vernier (CH)

(72) Inventors: Anne Humeau, Tregastel (FR); Romain Reynaud, Toulouse (FR); Amandine Scandolera, Reims (FR)

(73) Assignee: GIVAUDAN SA, Vernier (CH)

( * ) Notice: Subject to any disclaimer, the term of this patent is extended or adjusted under 35 U.S.C. 154(b) by 725 days.

(21) Appl. No.: 17/431,204

(22) PCT Filed: Feb. 29, 2020

(86) PCT No.: PCT/EP2020/055378
§ 371 (c)(1),
(2) Date: Aug. 16, 2021

(87) PCT Pub. No.: WO2020/178213
PCT Pub. Date: Sep. 10, 2020

(65) Prior Publication Data
US 2022/0133621 A1    May 5, 2022

(30) Foreign Application Priority Data

Mar. 1, 2019 (GB) .................................... 1902796
Mar. 8, 2019 (GB) .................................... 1903151

(51) Int. Cl.
*A61K 8/9706* (2017.01)
*A61Q 19/00* (2006.01)

(52) U.S. Cl.
CPC .......... *A61K 8/9706* (2017.08); *A61Q 19/005* (2013.01)

(58) Field of Classification Search
None
See application file for complete search history.

(56) References Cited

U.S. PATENT DOCUMENTS

| 7,220,417 B2 | 5/2007 | Nizard et al. |
| 2004/0136945 A1 | 7/2004 | Nizard et al. |
| 2011/0192073 A1 | 8/2011 | Kale |
| 2014/0127286 A1 | 5/2014 | Doucet et al. |

FOREIGN PATENT DOCUMENTS

| CN | 110 236 994 A | 9/2019 | |
| KR | 1020150041968 A | 4/2015 | |
| WO | WO-2013149323 A1 * | 10/2013 | ............... A61K 8/42 |
| WO | 2015136123 A1 | 9/2015 | |

OTHER PUBLICATIONS

International Search Report and Written Opinion of the International Searching Authority for corresponding application PCT/EP2020/055378 dated May 29, 2020.
Anonymous: "Phaeodactylum Tricornutum", The honest truth about beauty & personal care products, Jan. 1, 2013, retrieved from the Internet: URL: https://web.archive.org/web/20140720151046/http://www.truthinaging.com/ingredien ts/phaeodactylum-tricornutum.
Anonymous: "The Body Creme", Database GNPD [Online] MINTEL; May 18, 2006, retrieved from www.gnpd.com Database accession No. 533167.
J.P.K. Weder: Studies on proteins and amino acids exposed to supercritical carbon dioxide extraction conditions, Food Chemistry, Elsevier Ltd, NL, vol. 15, No. 3, Jan. 1, 1984, pp. 175-190, retrieved from the Internet: URL: https://www.sciencedirect.com/science/article/pi1/0308814684900025.
A. Maadane, et al: Antioxidant activity of some Moroccan marine microalgae: Pufa profiles, carotenoids and phenolic content, Journal of Biotechnology, vol. 215, Dec. 1, 2015, pp. 13-19, Amsterdam, NL.
Sang Min Kim, et al.: "A Potential Commercial Source of Fucoxanthin Extracted from Microalga Phaeodactylum tricornutum", Applied Biochemistry and Biotechnology, 166, pp. 1843-1855, published Feb. 2012.
BR Written Opinion of corresponding application BR112021015826-0 dated Oct. 22, 2025, along with the English translation.

* cited by examiner

*Primary Examiner* — Susan Hoffman
(74) *Attorney, Agent, or Firm* — Norris McLaughlin, PA

(57) ABSTRACT

Non-therapeutic methods of improving an individual's mood and of treating sensitive skin are provided.

9 Claims, 9 Drawing Sheets

COSMETIC COMPOSITION

This is an application filed under 35 USC 371 based on PCT/EP2020/055378 (WO 2020/178213), filed Feb. 29, 2020, which in turn is based on GB 1202796.0 filed Mar. 1, 2019 and GB 1903151.7 filed Mar. 8, 2019. The present application claims the full priority benefit of these prior applications and herein incorporates by reference the full disclosures of these prior applications.

The present invention relates to cosmetic compositions comprising a hydrophilic *Phaeodactylum tricornutum* extract.

Skin sensitivity (also called "itchy skin", "reactive skin", "skin discomfort", "tight skin feeling)" is a typical condition in which a set of stress factors triggers a cascade of biological reactions, ultimately leading to inflammation and redness, often paired with sensations of twinging and itching. The main causes of sensitive skin are genetic predispositions, hormonal factors, ageing, and exogenous factors. The skin microbiota also has an impact on the skin sensitivity status by triggering the skin immune system. A typical loss of microbiota diversity is observed in skin conditions related to sensitivity.

Sensitive skin is subject to an altered skin barrier, allowing penetration of various substances and opportunistic pathogens, thus leading to the immune system activation and recruitment of immune cells. Then, the cytokines release will lead to visible inflammation and redness.

In the long term, individuals with sensitive skin may suffer from chronic inflammation. This leads to an exhausted defence system that will affect not only the skin, but the individual's well-being in general.

Skin discomfort may impact the individual's mood, influence their self-confidence, and increase their difficulties in a social context due to this persistent negative skin feeling and appearance.

It is therefore desirable to improve the mood of a person suffering from sensitive skin.

It is further desirable to provide effective skin care for sensitive skin.

Surprisingly, it has now been found that, by applying a hydrophilic *Phaeodactylum tricornutum* extract to an individual's skin, said individual's mood is significantly improved.

Therefore, in a first aspect, the present invention provides a non-therapeutic method of improving an individual's mood, comprising the step of applying a cosmetic composition comprising a hydrophilic *Phaeodactylum tricornutum* extract to the individual's skin.

It was further found that the application of a hydrophilic *Phaeodactylum tricornutum* extract to sensitive skin has a positive effect on the skin condition. In particular, it is able to soothe and comfort the skin.

Therefore, in a second aspect, the present invention provides a non-therapeutic method of treating sensitive skin, comprising the step of applying a cosmetic composition comprising a hydrophilic *Phaeodactylum tricornutum* extract to the skin.

In particular, it was found that it was possible to reduce redness in sensitive skin by applying the cosmetic composition comprising the hydrophilic *Phaeodactylum tricornutum* extract to the skin.

It was further found that it was possible to soothe sensitive skin by applying the cosmetic composition comprising the hydrophilic *Phaeodactylum tricornutum* extract to the skin.

It was still further found that it was possible to reduce inflammation in sensitive skin by applying the cosmetic composition comprising the hydrophilic *Phaeodactylum tricornutum* extract to the skin.

It was still further found that it was possible to improve the skin microbiota composition in sensitive skin by applying the cosmetic composition comprising the hydrophilic *Phaeodactylum tricornutum* extract to the skin.

The hydrophilic *Phaeodactylum tricornutum* extract is also able to protect the extra-cellular matrix from chronic inflammation through epigenetic regulation.

Advantageously, the cosmetic composition comprising the hydrophilic *Phaeodactylum tricornutum* extract is applied to facial skin.

*Phaeodactylum tricornutum* is a microalgae. Coming from the dominant class of marine phytoplankton, the diatoms, this microalgae is found in coastal marine or brackish waters in temperate zones, and has brown, yellow or green-yellow plasts. *Phaeodactylum tricornutum* is a pennate diatom and produces oval, fusiform and triradiate morphs following changes in culture media, light and temperature. The fusiform morphotype is the most common in culture. The size of the cells is about 20-25 µm length and 4-5 µm width. The cells are mostly solitary or occasionally connected in pairs. *Phaeodactylum tricornutum* is widely used in crustacean and mollusc aquaculture because it has a high content of polyunsaturated fatty acids, especially eicosapentaenoic acid.

The use of a *Phaeodactylum tricornutum* extract as a cosmetic agent has been previously described in US 2004/0136945 A1. The respective product is currently sold under the commercial name Megassane® by Givaudan. However, in contrast to the present invention, US 2004/0136945 A1 relates to a lipophilic (or oily) extract of *Phaeodactylum tricornutum*. A detailed comparison of the lipophilic and hydrophilic extracts is provided in examples 14 and 15 below. In particular, they have a completely different composition, and the lipophilic extract does not exhibit any anti-inflammatory activity.

In one embodiment of the invention, the hydrophilic *Phaeodactylum tricornutum* extract used in the cosmetic composition of the present invention is an aqueous extract of *Phaeodactylum tricornutum*.

In one embodiment of the invention, the cosmetic composition comprises 0.1 to 10% v/v of the hydrophilic *Phaeodactylum tricornutum* extract, more preferably 0.5 to 5% v/v, and most preferably 1 to 3% v/v.

Typically, the cosmetic composition used in the methods of the present invention further comprises a cosmetically acceptable excipient.

Cosmetic compositions, and in particular skin care compositions, of the present invention may contain one or more cosmetically acceptable excipients. Any excipients commonly used in the preparation of cosmetic preparations for use on the human skin may be employed in the present invention. Suitable excipients include, but are not limited to ingredients that can influence organoleptic properties, penetration of the skin, and the bioavailability of the hydrophilic *Phaeodactylum tricornutum* extract. More specifically, they include liquids, such as water, oils or surfactants, including those of petroleum, animal, plant or synthetic origin, such as and not restricted to, peanut oil, soybean oil, mineral oil, sesame oil, castor oil, polysorbates, sorbitan esters, ether sulfates, sulfates, betaines, glycosides, maltosides, fatty alcohols, nonoxynols, poloxamers, polyoxyethylenes, polyethylene glycols, dextrose, glycerol, digitonin, and the like.

The formulation for topical application to the skin may take any physical form. For instance, the cosmetic composition, and in particular the skin care composition, may be in the form of a liposome composition, mixed liposomes, oleosomes, niosomes, ethosomes, milliparticles, microparticles, nanoparticles and solid-lipid nanoparticles, vesicles, micelles, mixed micelles of surfactants, surfactant-phospholipid mixed micelles, millispheres, microspheres and nanospheres, lipospheres, millicapsules, microcapsules and nanocapsules, as well as microemulsions and nanoemulsions, which can be added to achieve a greater penetration of the hydrophilic *Phaeodactylum tricornutum* extract.

The cosmetic composition, and in particular the skin care composition, may be produced in any solid, liquid, or semi-solid form useful for application to the skin topically or by transdermal application. Thus, these preparations of topical or transdermal application include, but are not restricted to, creams, multiple emulsions, such as and not restricted to, oil and/or silicone in water emulsions, water-in-oil and/or silicone emulsions, water/oil/water or water/silicone/water type emulsions, and oil/water/oil or silicone/water/silicone type emulsions, micro-emulsions, emulsions and/or solutions, liquid crystals, anhydrous compositions, aqueous dispersions, oils, milks, balsams, foams, aqueous or oily lotions, aqueous or oily gels, cream, hydro-alcoholic solutions, hydro-glycolic solutions, hydrogels, liniments, sera, soaps, face masks, serums, polysaccharide films, ointments, mousses, pomades, pastes, powders, bars, pencils and sprays or aerosols (sprays), including leave-on and rinse-off formulations.

Figure 1:
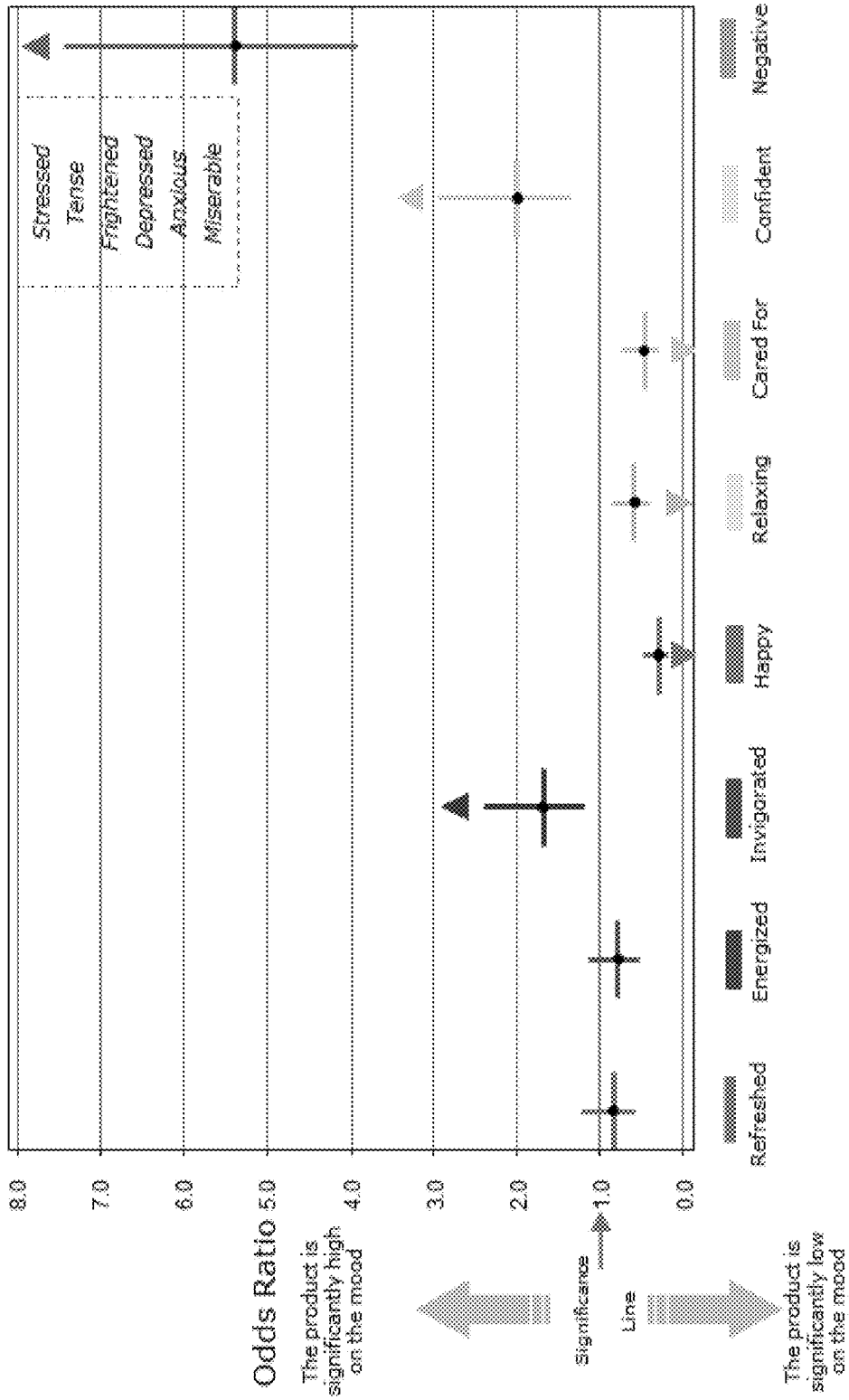
FIG. 1 shows an overview of the Mood Portraits® Test on Day 0.

In a further aspect, the present invention relates to the use of a hydrophilic *Phaeodactylum tricornutum* extract for improving an individual's mood.

In a further aspect, the present invention relates to the use of a hydrophilic *Phaeodactylum tricornutum* extract for treating sensitive skin.

The effects of a cosmetic composition comprising a hydrophilic *Phaeodactylum tricornutum* extract on individuals having sensitive skin were investigated in the course of a long-term clinical study over 28 days (for details, see examples below). During this time, the individuals applied a facial cream containing a hydrophilic *Phaeodactylum tricornutum* extract twice per day to their facial skin. The individual's mood and facial skin condition were assessed before and after the 28 days.

Influence on mood was measured using two non-verbal techniques: Mood Portraits® and assessment of non-verbal communication according to Emotion Decoding System®.

The Mood Portraits® method uses pictures to measure consumers' mood and emotional responses. It has been described for a different purpose in Churchill et al.: "Comparison of methods used to study consumer emotions associated with fragrance", Food Quality and Preference, 21 (2010), 1108-1113. In contrast to this previous study, which deals with the instantaneous influence of a fragrance smelled by an individual, the present invention is based on a long-term study.

The Mood Portraits® method is able to elicit spontaneous responses from consumers, overcoming the barrier of using words or scales. It has been proven to be more discriminatory than standard mood attribute scaling methods. The method delivers a reliable mood profile for each product tested and provides insights into how consumers respond to different products and the emotions they evoke.

A detailed description of how Mood Portraits® was used for assessing the effects of the cosmetic composition comprising a hydrophilic *Phaeodactylum tricornutum* extract used in the methods of the present invention is described in example 3. In this study, a significant improvement compared to the starting condition was demonstrated, with a decrease of negative mood and an increase of confidence when applying the facial cream containing hydrophilic *Phaeodactylum tricornutum* extract.

Emotion Decoding System® (Tcherkassof et al.: "Facial expressions of emotions: A methodological contribution to the study of spontaneous and dynamic emotional faces", European Journal of Social Psychology, 2007, 37, 1325-1345; and Mehrabian at al.: "Decoding of Inconsistent Communications", Journal of Personality and Social Psychology, 1967, 6, 108-114), on the other hand, is a method developed by Marina Cavassilas, PhD in Linguistics and expert in non-verbal communication. It involves the analysis of over 200 non-verbal reactions, including facial reactions, postures, gestures, and voice.

The study is described in detail in example 4.

The non-verbal communication analysis demonstrated a clear improvement of the individuals' happiness and fortitude for those using the active, while those using placebo showed neutral emotional as much positive or negatives emotions.

In conclusion, a cosmetic composition comprising a hydrophilic *Phaeodactylum tricornutum* extract was found to significantly evoke positive emotions and reduce negative emotions. In particular, it was able to evoke the emotions Confident, Invigorated, Sensuality, and Protection. The placebo, on the other hand, did not evoke any of these emotions.

Effects on sensitive skin were assessed by means of several in vitro, ex vivo, and clinical studies described in more detail in the examples below.

Using transcriptomic analysis, it was demonstrated that the hydrophilic *Phaeodactylum tricornutum* extract has anti-inflammatory properties. Indeed, a significant modulation of gene expression involved in inflammation and skin calming was found.

Using an ex vivo irritation model, it was confirmed that the hydrophilic *Phaeodactylum tricornutum* extract is efficient against sensitive skin, which is related to problems such as immune cells infiltration, cytokine secretion leading to inflammation.

The hydrophilic *Phaeodactylum tricornutum* extract also led to a significant inhibition of monocyte transmigration across the endothelium with a dose-dependent effect.

Using a sensitive skin model, it was demonstrated that topical application of hydrophilic *Phaeodactylum tricornutum* extract at a concentration of 3% v/v induced a significant reduction in immune cell recruitment, decreased the pain receptor TRPV1, and inhibited the pro-inflammatory cytokine production (IL8).

In addition, it was evidenced that hydrophilic *Phaeodactylum tricornutum* extract is able to significantly improve the beta-defensin production, which is involved in the anti-microbial defence.

In conclusion, it was found that, through epigenetic and genetic regulation, hydrophilic *Phaeodactylum tricornutum* extract acts on:
- reducing the immune cell recruitment,
- reducing the pro-inflammatory mediators (reduction of IL8),
- decreasing the pain sensation (TRPV1),
- increasing the anti-microbial defences of the skin, and
- rebalancing and protecting skin microbiota.

In a clinical study, the skin reactivity to capsaicin was tested after 28 days of treatment with the hydrophilic *Phaeodactylum tricornutum* extract at a concentration of 3%. The results showed a significant improvement of skin reactivity to capsaicin compared to placebo.

In another clinical study, it was found that the hydrophilic *Phaeodactylum Tricornutum* extract acts on the skin microbiota to protect and improve its composition, rebalancing its equilibrium from sensitive skin to normal skin conditions.

The present invention is further illustrated by means of the following non-limiting examples:

Example 1

Preparation of the Hydrophilic *Phaeodactylum Tricornutum* Extract 505.86 g of *Phaeodactylum tricornutum* frozen biomass (ex NECTON (Portugal), MICROPHYT (France) or INNOVALG (France); dry matter>15%) was added to 979 g of water. The solution was stirred with a magnetic stirrer and heated to 50° C. Then, the pH was adjusted to 4.5 with sulfuric acid (0.99 g) and 1.1 g of enzyme (celluclast 1.5 L from Novozymes) was added to the mix. After 2 hours of hydrolysis, the enzyme was inactivated by heating the solution to 90° C. for 10 minutes. After cooling, the pH was brought to 5 with sodium hydroxide (1.25 g). The solution was then centrifuged for 20 minutes at 4500 rpm and the supernatant filtered on cellulose plates ranging from 1.5 μm to 0.3 μm. The solution was then filtered on activated charcoal plates to deodorize the product before final sterilizing filtration. At the end of the process, the extract was stabilized by adding 3% of Minasolve Green B (preservative from Minasolve; mixture of pentylene glycol, sodium benzoate, benzoic acid and water).

Example 2

Preparation of Skin Care Compositions Comprising the hydrophilic *Phaeodactylum Tricornutum* Extract For the in vitro studies, the following compositions were prepared:

Epigenetic and transcriptomic analysis (examples 5 and 6): The hydrophilic *Phaeodactylum tricornutum* extract of example 1 was diluted at 3% v/v in culture medium (basal keratinocyte basal medium (KBM)).

Immune cell transmigration (example 9): The hydrophilic *Phaeodactylum tricornutum* extract of example 1 was diluted at different concentrations (% v/v) in culture medium (Endothelial growth medium (EGM)).

For the ex vivo studies, the following compositions were prepared:

Irritated skin model (example 7): The hydrophilic *Phaeodactylum tricornutum* extract of example 1 was diluted at 1% and 3% v/v, respectively, in phosphate buffered saline (PBS).

TRPV1, IL8 release, Immune cell infiltration (CD1a) (example 8): The hydrophilic *Phaeodactylum tricornutum* extract of example 1 was diluted at 3% v/v in phosphate buffered saline (PBS).

β-defensin-2 production (example 10): The hydrophilic *Phaeodactylum tricornutum* extract of example 1 was diluted at 3% v/v in phosphate buffered saline (PBS).

For the clinical studies (examples 3, 4, 11, and 12), the following composition was prepared:

Cream formula with 3% v/v of the hydrophilic *Phaeodactylum tricomutum* extract of example 1, having the following composition:

| INCI Name | % |
|---|---|
| AQUA/WATER | 89.7 |
| CETYL ALCOHOL, GLYCERYL STEARATE, PEG-75 STEARATE, CETETH-20, STEARETH-20 | 5.0 |
| ISODECYL NEOPENTANOATE | 4.5 |
| PHAEODACTYLUM TRICORNUTUM EXTRACT | 3.0 |
| PHENOXYETHANOL, METHYL PARABEN, PROPYL PARABEN, ETHYL PARABEN | 0.4 |
| DIMETHICONE | 0.3 |
| FRAGRANCE, HEXYL CINNAMAL, BUTYLPHENYL METHYLPROPIONAL, CITRONELLOL, ALPHA ISOMETHYL IONONE, HYDROXYISOHEXYL 3-CYCLOHEXENE CARBOXALDEHYDE | 0.1 |

Example 3

Mood Portraits® Test

Materials and Method 28 day clinical study on 42 female volunteers having sensitive skin (age 18-50).

All participants completed the Mood Portraits® test on Day 0 (baseline) and Day 28 (post usage) prior to starting the clinical tests described in examples 11, 12 and 13 below.

Participants were randomly assigned to 2 groups: Active (3% v/v hydrophilic *Phaeodactylum Tricornutum* extract in a skin cream formulation) vs. placebo (skin cream formulation without *Phaeodactylum Tricornutum* extract); anonymised products were applied twice daily, in the morning and evening, by participants.

Comparisons of moods (percentages of pictures selected) were calculated for each test condition (baseline=D0; active; placebo).

At both time points, participants were asked to think of their skin, in particular their facial skin, and to select the pictures that best corresponded to the emotions that came to their mind.

Figure 2:
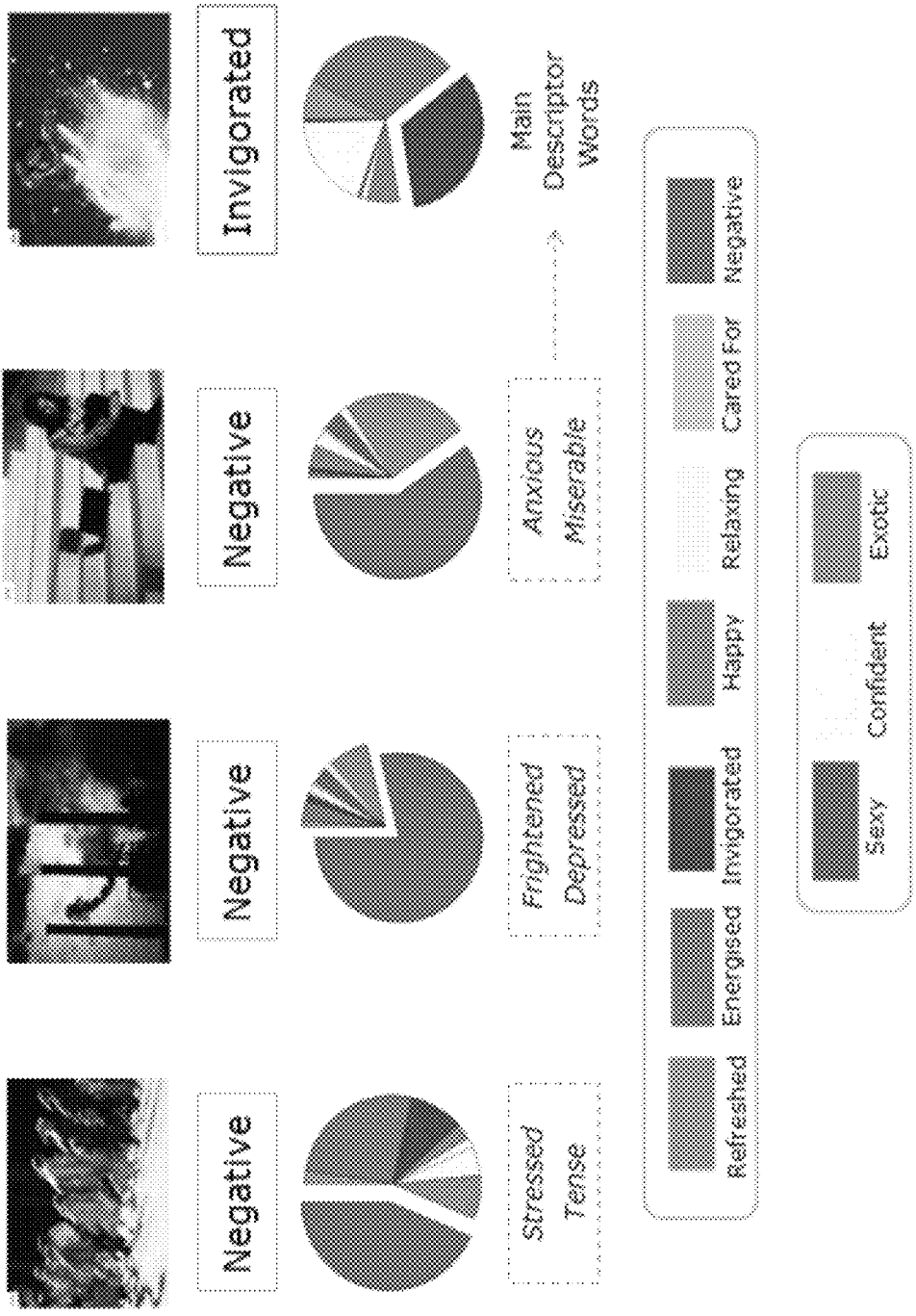
FIG. 2 shows the top pictures of the Mood Portraits® Test on Day 0.
Figure 3:
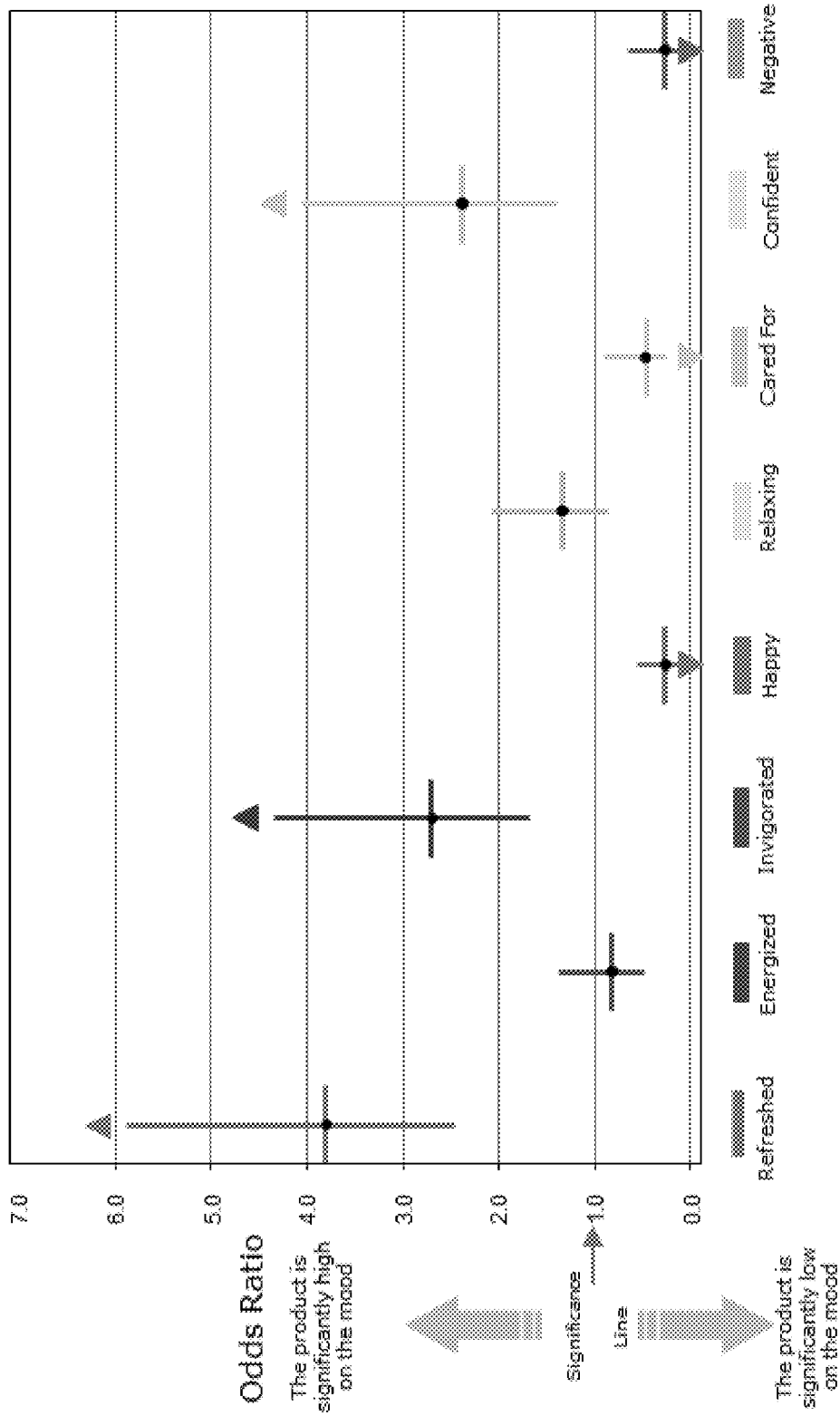
FIG. 3 shows an overview of the Mood Portraits® Test after 28 days of treatment with the active.
Figure 4:
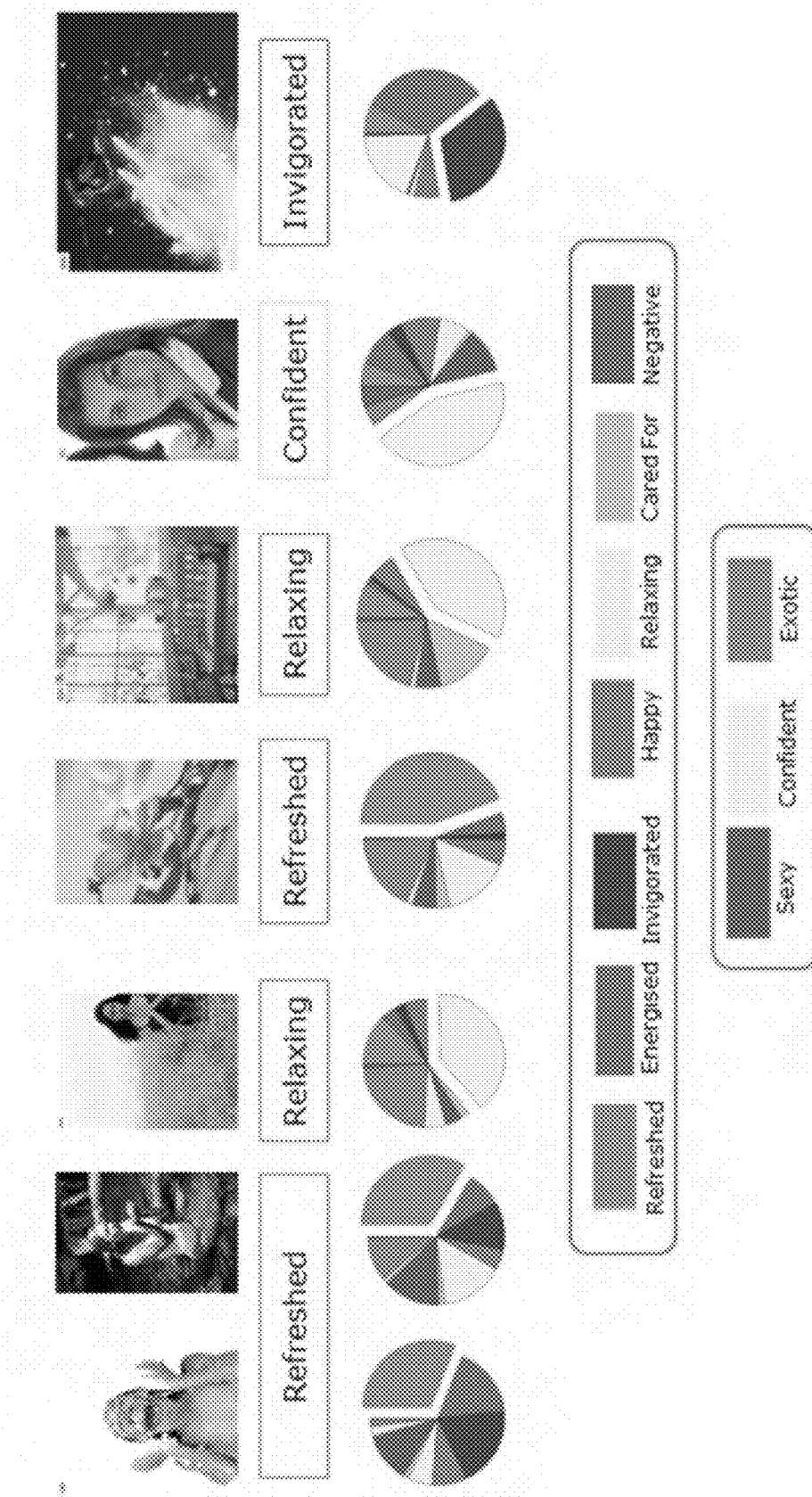
FIG. 4 shows the top pictures of the Mood Portraits® Test after 28 days of treatment with the active.
Figure 5:
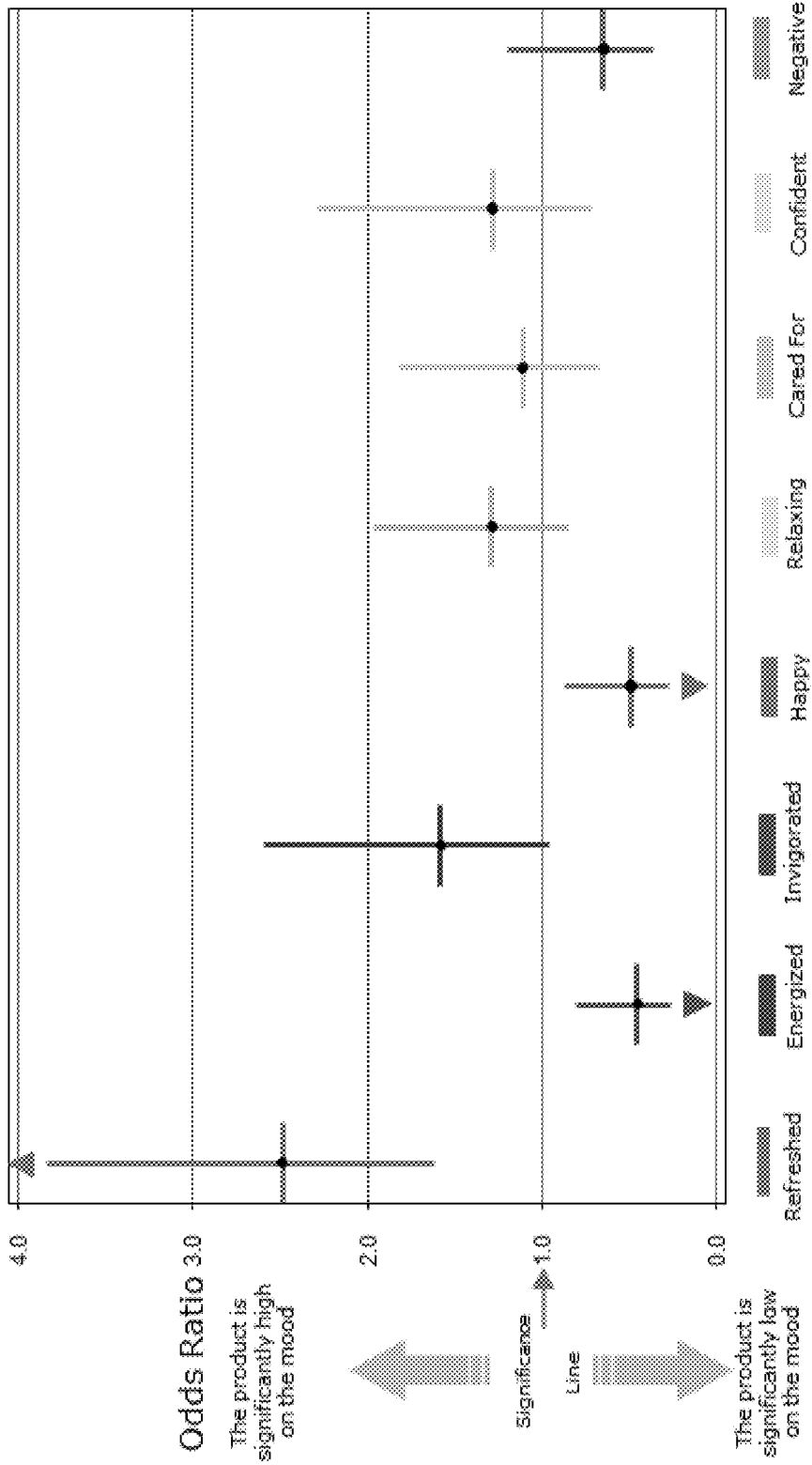
FIG. 5 shows an overview of the Mood Portraits® Test after 28 days of treatment with the placebo.
Figure 6:
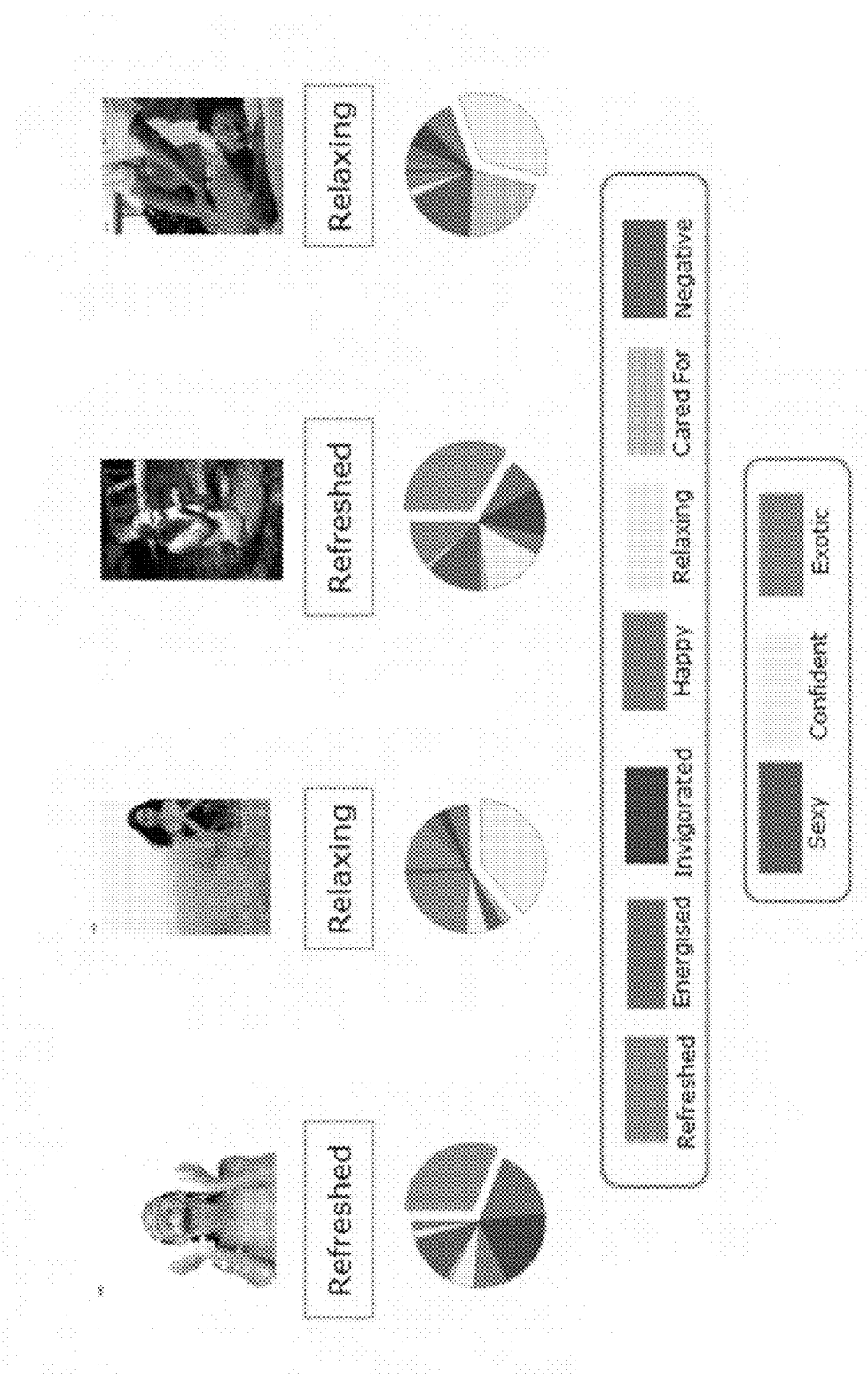
FIG. 6 shows the top pictures of the Mood Portraits® Test after 28 days of treatment with the placebo.

The results for baseline (day 0), active at day 28, and placebo at day 28 are shown in the following figures:

|  | Overview | Top pictures |
|---|---|---|
| Day 0 | FIG. 1 | FIG. 2 |
| Day 28 (active) | FIG. 3 | FIG. 4 |
| Day 28 (placebo) | FIG. 5 | FIG. 6 |

Figure 7:
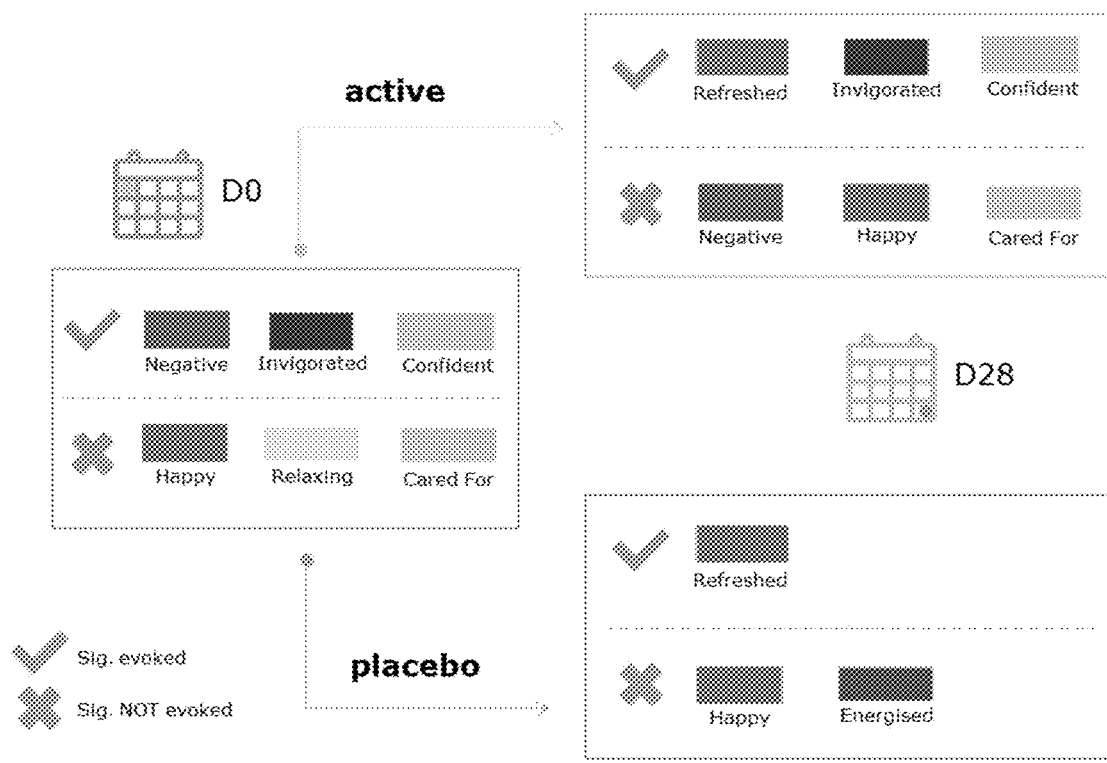
FIG. 7 shows a summary of the effects identified in the Mood Portraits® Test.

The effects are summarized in FIG. 7.

Day 0 results show that participants had a very negative emotional response when thinking about their facial skin. These results confirm that having a discomfort and sensitive skin has a real impact on an individual's mood.

At Day 28, participants have a significantly more positive emotional response when thinking about their facial skin; with the active group evoking more significant positive mood responses.

50% of participants selected negative pictures in response to how they felt about their skin at Day 0 vs. 6% for the active and 13% for the placebo at Day 28.

Top Pictures for Active and Placebo are similar; this reflects the placebo effect when running a skin care clinical trial. However, the active individual mood profile graph indicated more positive significant mood effects than the placebo.

Refreshed, invigorated and confident moods were significantly evoked in active group vs not significantly evoked in placebo group.

Negative mood was significantly not evoked in active group, indicating a positive change in how they felt about their facial skin since Day 0.

Example 4

Emotion Decoding System®

28 day clinical study on 40 female volunteers (age 18-50) having sensitive skin.

A face to face individual interview was conducted, 5-10 minutes each person, as a sequential monadic, blind test. Non-verbal reactions were collected and decoded from videos by Marina Cavassilas, using Emotion Decoding System®.

Participants were randomly assigned to 2 groups: Active (3% v/v hydrophilic *Phaeodactylum Tricornutum* extract in a skin cream formulation) vs. placebo (skin cream formulation without *Phaeodactylum Tricornutum* extract); anonymised products were applied twice daily, in the morning and evening.

The active was found to be very emotionally effective, provoking a significantly higher number of positive emotions and significantly lower negative emotions vs. placebo.

The active also generated a wider range of positive emotions (sensuality, protective, happiness, appeasement, fortitude) than the placebo, and only a single type of negative emotion (aggression); whereas placebo generated a wider range of negative emotions (aggression, unpleasantness, contrariety, disinterest).

Quantitatively, the active generated more than twice the number of positive emotions than placebo and three times less negative emotions than placebo. These results highlight the efficacy of the hydrophilic *Phaeodactylum Tricornutum* extract for improving an individual's mood, in particular for an individual having sensitive skin.

Example 5

Epigenetic Modulation Using Exosome Cell Communication System

NHEK Treatment with Hydrophilic *Phaeodactylum Tricornutum* Extract

Keratinocytes were treated with the hydrophilic *Phaeodactylum tricornutum* extract at 1% directly in culture medium (Epilife basal medium 60 µM calcium complemented with HKGS, Penicillin and streptomycin) for 24 h.

Exosome Extraction and NHDF Stimulation

Keratinocytes were seeded in T175 flasks (BD Falcon) until cells reached 80% of confluency. Then, the medium was replaced with fresh culture media with or without treatment and cells were incubated for 24 or 48 hours before exosomes extraction. 15 ml of supernatants were collected and cell debris was removed by centrifugation for 30 min at 3500 g and 4° C. The culture media was concentrated on column filter (Amicon Ultra-15 100K centrifugal filter devices, Merk-Millipore). Exosomes from concentrated cell culture media were isolated using Exo-Prep (HansaBioMed) according to the manufacturer's instructions. Pelleted exosomes were resuspended in 100 µl of sterile PBS 1×.

Exosomes in suspension were quantified using EXOCET Exosome Quantitation Assay kit (System Biosciences), according to the manufacturer's instructions. This quantitation kit is designed as a direct measurement of esterase activity known to be within exosomes. It is an enzymatic, colorimetric assay, read at OD405 nm.

Fibroblasts were treated with culture medium (DMEM medium (with pyruvate, glutamax, 4.5 g/l glucose; GIBCO) complemented with 10% FBS, penicillin and streptomycin) enriched with the same amount of exosomes purified from keratinocyte culture medium (treated or untreated) for 24 h.

miRNA Analysis by Real-Time qPCR

Total RNA with miRNA NHFDs was extracted and purified using miRCURY RNA Isolation Kit (from Exiqon), following the manufacturer's instructions. Quality control and total RNA quantification were performed using Agilent RNA Nano kit and Analysis Agilent 2100 bioanalyzer. For mRNA target quantification, total RNA was reverse-transcribed with the Superscript VILO cDNA Synthesis Kit (ThermoFisher) according to the manufacturer's instructions. Quantitative PCR was performed with a Platinum Quantitative PCR SuperMix-UDG Kit (Invitrogen) according to the manufacturer's instructions using the CFX-connect (Biorad). All of the experiments were performed in duplicate for each biological replicate. The results were normalized to endogenous control GAPDH expression.

For micro-RNA quantitation, total RNA was reverse-transcribed with the Universal cDNA Synthesis Kit II (Exiqon) according to the manufacturer's instructions. Reverse transcription reactions were diluted, and a fraction of diluted cDNA was used for each quantitative PCR. Quantitative PCR was performed with an Exilent SYBR Green master mix kit (Exiqon) according to the manufacturer's instructions using the CFX-connect (Biorad). All of the experiments were performed in duplicate for each biological replicate. The results were normalized to RNU1A expression.

miRNA tested: miR-21. miR-21 lies at the intersection of senescence, inflammation, and age-related diseases (Olivieri et al., "Age-related differences in the expression of circulating microRNAs: miR-21 as a new circulating marker of inflammaging", Mechanisms of Ageing and Development 133 (2012) 675-685). It seems to play a major role in aging by promoting MMPs (3 and 9) expression through autophagy silencing, and collagen degradation.

Statistical Analysis

The comparison of the different parameters was performed with the Student's test. P<0.05 is considered to be statistically significant.

Results

Figure 8:
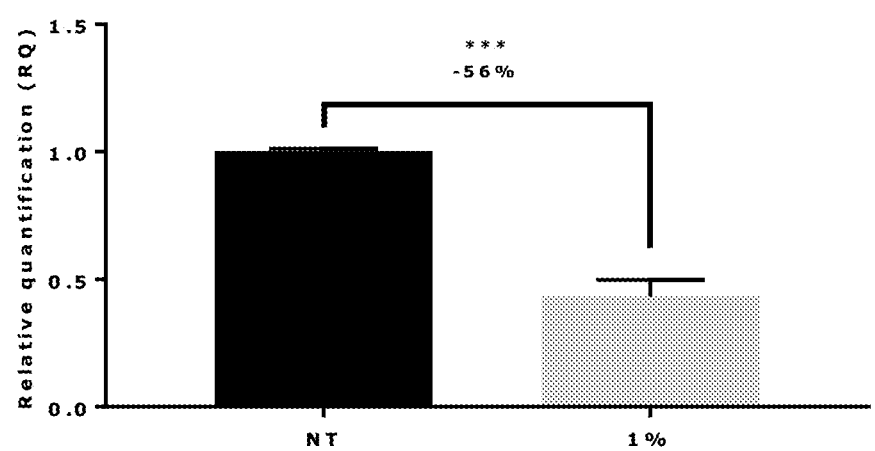
FIG. 8 shows the results of the epigenetic modulation using exosome cell communication system.

After being treated for 24 hours with the hydrophilic *Phaeodactylum tricornutum* extract at 1% v/v, exosomes from keratinocytes supernatants were applied as a treatment to the fibroblasts culture for 24 hours. miRNA extraction from fibroblasts revealed an significant decrease of miR21 (−56%, p value<0.001) expression with the hydrophilic *Phaeodactylum tricornutum* extract at 1% (FIG. 8). This evidences an inter-cellular communication between keratinocytes and fibroblasts through the exosomal cell-cell communicator system.

In conclusion, this study evidenced that the hydrophilic *Phaeodactylum tricornutum* induces an epigenetic control of inflammation through the inhibition of miR21 thanks to the exosomal cell-cell communicator system.

Example 6

Transcriptomic Analysis

Cell Culture Conditions

Normal Human Epidermal Keratinocytes (NHEKs; K36A) were seeded at 300 000 cells per well in specific plates coated with Collagen I in 6-wells plate. The NHEKs cells were put in resting for one night in KBM Gold medium (Keratinocyte basal medium, i.e. culture medium specific to keratinocytes without supplements) before stimulation. Cells were stimulated with 3% v/v hydrophilic *Phaeodactylum Tricornutum* extract.

RNA Extraction and RT-qPCR

After 6 h and 18 h of stimulation, total RNA was extracted using Trizol (guanidinium thiocyanate-phenol-chloroform extraction):
1. Addition of 1 ml of Trizol per well and performance of several aspiration/discharge-cycles in a 2 ml tube.
2. Incubation at room temperature for 5 min and addition of 200 µL of a mixture of Chloroform:IAA (24:1).
3. Vigorous shaking three times for 10 s.
4. Incubation at room temperature for 3 min, followed by centrifuging at 12,000 G for 15 min at 4° C.
5. Collecting the aqueous phase (superior phase limpid) in a 1.5 ml tube.
6. Addition of 500 µl of isopropanol to precipitate RNA and mixing by gently inversing.
7. Incubation at room temperature for 10 min, followed by centrifuging at 12,000 G for 10 min at 4° C.
8. Elimination of supernatant, followed by washing the RNA pellet with 1 mL EtOH 75%.
9. Centrifuging at 7,500 G for 5 min at 4° C., and washing again with 1 mL EtOH 75%.
10. After the last washing, the RNA pellet was dried and then dissolved in pure water to (10 µL).

The quantity and purity of total RNA extracted was quantified by spectroscopy (ratio 260 nm:280 nm and 260 nm:230 nm).

The total RNA samples were diluted at 1/20 in pure water before analysis.

All concentrations were adjusted to 250 ng/µL for each condition, and the quality of RNA was determined by gel migration.

RNA Retro-Transcription

The total RNA samples were retro-transcribed to cDNA using the Verso cDNA Synthesis Kit (ex Thermo Fisher Scientific) as described below. 500 ng of total RNA were retro-transcribed to cDNA (2 µL)

Conditions of retro-transcription reaction:

| 1. | cDNA synthesis buffer 5x | 4 µL |
| 2. | dNTP (5 mM) | 2 µL |
| 3. | OligodT | 0.25 µL |
| 4. | Hexameres | 0.75 µL |
| 5. | Verso Enzyme mix | 1 µL |
| 6. | RT enhancer | 1 µL |
| 7. | Water | 9 µL |
| 8. | Total RNA (250 ng/µL) | 2 µL |

Total volume: 20 µl giving 500 ng for 20 µL: 25 ng/µL. Retro-transcription was performed on 4 µL of RNA (250 ng/µL): 1000 ng.

Program used: LID 103° C.→Wait→42° C.-2 min-→Pause press ENTER→42° C.-30 min→95° C.-2 min→Hold 10° C. END cDNA obtained was validated by classical PCR using human actin primers, which is a well-known housekeeping gene.

PCR mixture was composed of:

| 1. | Buffer 10X | 2.5 µL |
| 2. | MgCl$_2$ (25 mM) | 1.5 µL |
| 3. | dNTP (1 0 mM) | 0.5 µL |
| 4. | Primers (sense and reverse) 10 µM | 1 µL |
| 5. | Taq (polymerase) | 0.1 µL |
| 6. | Water (qsp 24.5 µL) | 18.9 µL |
| 7. | cDNA | 0.5 µL |

Program used: LID 103° C.→Wait→94° C.-3 min-→Pause press ENTER→94° C.-3 min (enzyme activation)→94° C.-30 s (hybridization)→60° C.-30 s (Tm)→72° C.-30 s (elongation)→repeating hybridization, Tm and elongation 39 times→72° C.-10 min (final elongation)→END qPCR on TaqMan Plate (Applied)

The cDNAs were diluted at 1/25 in pure water=2 ng/µL of cDNA. 5 µL of cDNA (10 ng) was deposited per well and completed with the Taqman PCR Mix to 10 µL final (life Technologies).

Program used: 50° C. for 2 min→95° C. for 10 min→95° C. for 15 sec→60° C. for 1 min+plate read→repeating (95° C. for 15 sec→60° C. for 1 min+plate read) for 39 more times→END Results Transcriptomic analysis was performed by RT-qPCR on epidermis plates. The results are presented below by comparison to controls (untreated cells) and normalized with the average of the two most stable housekeeping genes (IP08 and EIF2B1). Volcano plots were used to identify significant modifications induced by the treatment. A gene variation is considered as significant when p value is inferior to 0.05.

Figure 9:
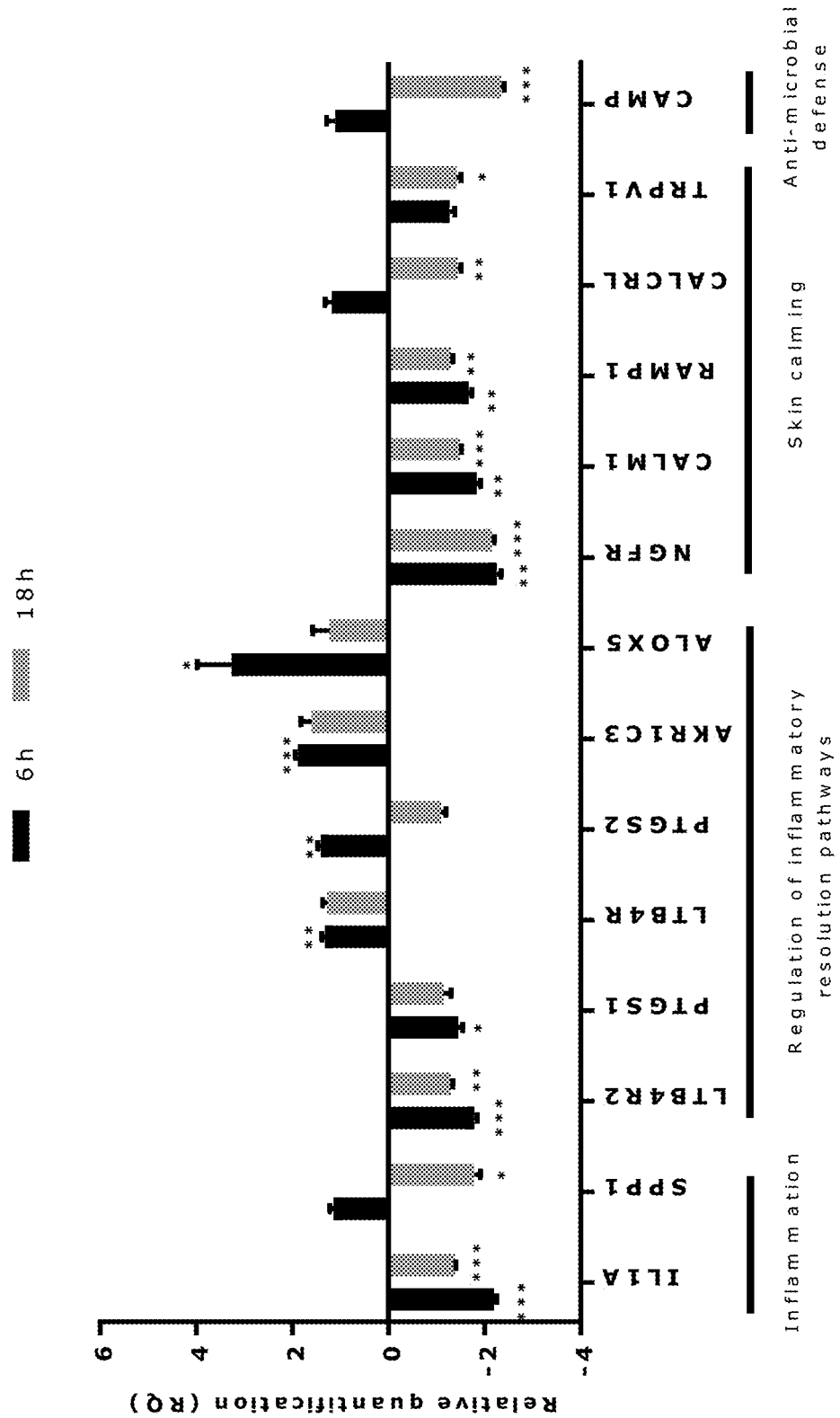
FIG. 9 shows the results of gene modulation after 6 hours and 18 hours of treatment with 3% hydrophilic *Phaeodactylum Tricornutum* extract.

After 6 h of stimulation, 23 genes were significantly modulated by at least 30% by the hydrophilic *Phaeodactylum Tricornutum* extract, and 25 genes after 18 h of stimulation. Results are shown in FIG. 9 (Gene modulation after 6 hours and 18 hours of treatment with 3% hydrophilic *Phaeodactylum Tricornutum* extract. Student's test; *: p value<0.05; : p value<0.01; *: p value<0.001.).

In both periods of stimulation, a clear distinction between the untreated and treated conditions was observed and a majority of genes downregulated, among them genes involved in inflammation and skin calming.

The transcriptomic study reveals that the hydrophilic *Phaeodactylum Tricornutum* extract is suitable for treating sensitive skin.

Example 7

Ex Vivo Model of Irritated Skin

Model of Human Skin Maintained in Survival Conditions

Three normal human skin fragments were obtained in plastic surgery from residual skin tissue, from different female donors (age 45, 66, and 30). Skin fragments were cut into 1 cm² pieces and washed three times using antibiotics.

Skin biopsies were placed with the epithelium facing up, at an air/liquid interface, on culture inserts (filter pore size 12 μm; Costar, VWR International, Fontenay-sous-Bois, France). These inserts were set on a 12-wells plate at 37° C. in a humidified incubator with 5% $CO_2$. The organ cultures were conserved with Dulbecco's minimal essential medium (Invitrogen Corporation, Paisley, UK) containing antibiotics (100 U/ml penicillin and 100 μg/ml streptomycin; Invitrogen), 200 μg/ml L-glutamine (Invitrogen Corporation, Paisley, UK) and fetal calf serum (DAP, Neuf-Brisach, France). Medium was added to the wells so that the surface of the medium was levelled with the filter. The fragments were kept alive ex vivo for 24 hours.

Irritated Skin with Sodium Lauryl Sulfate (Epidermal Level) and Substance P (Dermal Level)

In the above skin samples maintained in survival, the addition of 10 μM substance P in the culture medium allows for obtaining a vascular dilation with edema and inflammatory elements rush (lymphocytes and mastocytes) in the dermis. The application of sodium lauryl sulfate (SLS) at 2% (anionic tensio-active product known to cross the cutaneous barrier) allows for obtaining a cutaneous irritation with epithelial alteration.

Topical Application of the Hydrophilic *Phaeodactylum Tricornutum* Extract

At Day 0, the hydrophilic *Phaeodactylum Tricornutum* extract at two different concentrations (1% and 3% v/v) was applied on the epidermis. Following 2 hours, 2% SLS was applied on the epidermis during 2 hours, then rinsed in phosphate-buffered saline (PBS). Then, the culture medium was refreshed and 10 μM of Substance P was added in the culture medium to create an inflammation model. A control condition was made with Capsazepine, which allows for blocking substance P action.

At Day 1, a third application of the hydrophilic *Phaeodactylum Tricornutum* extract was made. After 7 hours, skin fragments were fixed in formaldehyde and supernatants were collected for cytokines assays.

Histological Analysis of Alterations in Epidermis

Histological slices were created from the fragments fixed in formaldehyde and enclosed in paraffin. Staining by hemaluneosin was effectuated. Analysis of the epidermis was effectuated on the entire histological slice (using a Olympus® BX41 microscope, ×40 magnification). Modified cells were counted on each slice and on epidermal cells per field of vision in order to determine the percentage of altered cells.

Semi-quantitative scores (0 to 3) were applied to the entire slice examined in order to quantify eventual alterations to the epithelium.

Changes to the keratinocytes were analyzed within the epidermis:
1. score 0: no alteration;
2. score 1: light reduction of dyeing affinity with the use of eosin for the cell's cytoplasm and with the use of hematein for the nucleus;
3. score 2: strong clarity of the cell's nucleus or presence of a clear halo encircling the nucleus;
4. score 3: empty appearance of the cell or eosinophilic necrosis (about 50% of the cells totality).

Statistical Analysis

The results were presented under data mean obtained from three independents experiments at minimum. The averages were expressed with error standard to mean (SEM). Student T test was used for statistical analysis with ns: not significant, *: $p<0.05$, : $p<0.01$ and *: $p<0.001$.

Epidermis Alteration Evaluation

Figure 10:
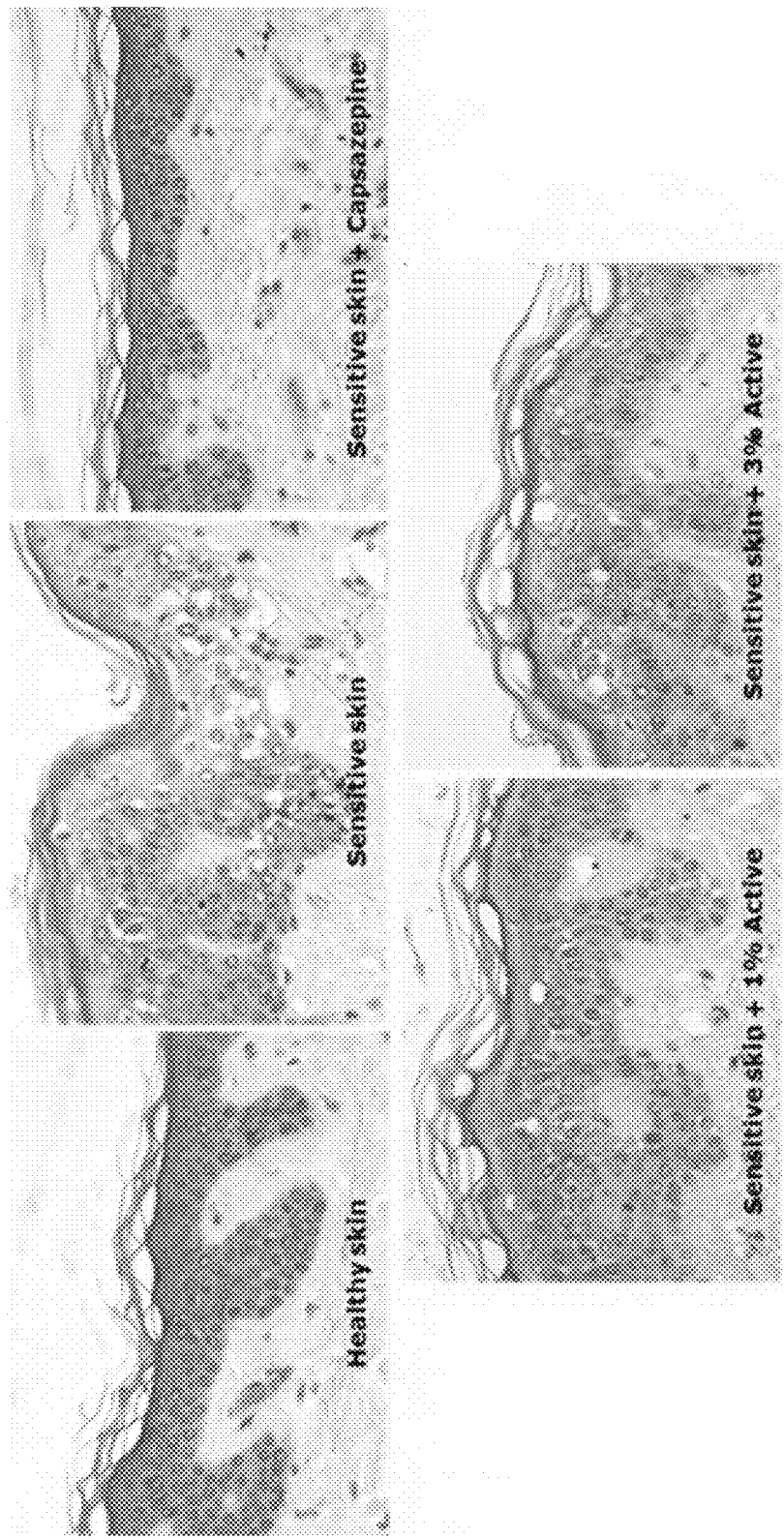
FIG. 10 shows a morphological analysis of skin explants cultivated in normal and inflammation conditions after treatment with the hydrophilic *Phaeodactylum Tricornutum* extract at 1% and 3% using Hematoxylin-Eosin staining.

The morphological analysis showed drastic modification of epidermis and dermis aspects reflecting an inflamed and sensitive skin. Capsazepine used here as a reference molecule counteracted these effects and restored the skin for a more healthy skin aspect (FIG. 10: Morphological analysis of the skin explants cultivated in normal and inflammation conditions after treatment with the hydrophilic *Phaeodactylum Tricornutum* extract at 1% and 3% using Hematoxylin-Eosin staining).

The scoring of the epidermis alteration was performed by anapathologist evaluation. Sodium lauryl sulphate (SLS) induced a moderate cutaneous irritation with significant epidermal alterations (score of 1.35) in comparison to untreated skin. A significant protection of the skin against SLS was obtained after application of the hydrophilic *Phaeodactylum Tricornutum* extract at 1% and 3% with respective scores of 1.05 (−22%) and 0.98 (−27%) versus 1.35 for SLS. A similar result was obtained with capsazepine with a score of 0.18 (−87%).

In conclusion, the hydrophilic *Phaeodactylum Tricornutum* extract significantly protects and restores the skin from irritation.

Example 8

Treatment of Sensitive Skin

Human Skin Model Maintained in Survival

Skin fragments from 3 Caucasian subjects (female, age 33, 44, and 52) obtained by abdominoplastie were cut into 1 cm² pieces and washed three times using antibiotics. Subcutaneous fat and lower dermis were mechanically removed under a stereomicroscope using a surgical scalpel.

Skin biopsies were placed with the epithelium facing up, at an air/liquid interface, on culture inserts (filter pore size 12 μm; Costar, VWR International, Fontenay-sous-Bois, France). These inserts were set on a 12-wells plate for 24 hours at 37° C. in a humidified incubator with 5% $CO_2$. The organ cultures were conserved with Dulbecco's minimal essential medium (Invitrogen Corporation, Paisley, UK) containing antibiotic, L-glutamine, bovine pituitary extract, growth factors and fetal calf serum (DAP, Neuf-Brisach, France). Medium was added to the wells so that the surface of the medium was levelled with the filter.

Application of the Hydrophilic *Phaeodactylum Tricornutum* Extract

Hydrophilic *Phaeodactylum Tricornutum* extract was topically applied preventively to J0, 2 h before realization of sensitive skin model and aggression by UVB.

The sensitive skin model consisted in one topical application of 15 µL/cm² of 1% SLS during 1 hour, followed by a rinse (PBS 1×) then addition of 5 µM capsaicine in culture medium. One UVB session at 2 J/cm² (Vilber Lourmat lamp) was realized 2 hours after the preparation of the sensitive skin model to help boost the reactivity of this skin.

A comparison between four conditions was made:
1. untreated skin
2. skin treated by hydrophilic *Phaeodactylum Tricornutum* extract at 3%
3. sensitive skin (capsaicine and SLS+agression UVB)
4. sensitive skin+hydrophilic *Phaeodactylum Tricornutum* extract at 3%

After 24 hours of survival, skin fragments were taken and fixed in formaldehyde. Culture supernatants were collected and frozen at −32° C. for IL8 assay.

Immunohistochemical Evaluation of CD1a for Dendritic Cells

Langerhans cells were highlighted in epidermis with a mouse monoclonal antibody against CD1a (Dako, clone 010, undiluted). The immunodetection was made with an indirect technique of immunoperoxydase in 3 levels, amplified (kit CSAII, DAKO) and stained in red by AEC (3-amino-9-ethylcarbazole). The number of positive CD1a epithelial cells was counted on 10 areas of the histological slice (magnification×400).

Discomfort and Painful Sensation—Immunohistochemical Evaluation of TRPV1 Receptors TRPV1 receptors were highlighted in epidermis with a rabbit polyclonal IgG antibody (Novus, gene ID 7442, 1/750 diluted). The immunodetection was made with an indirect technique of immunoperoxydase in 3 levels, amplified (kit CSAII, DAKO) and stained in red by AEC (3-amino-9-ethylcarbazole). A semi-quantitative scoring of the intensity of the immunostaining was used on these slides (from 0: no staining to 4: very important staining) on 10 areas of the histological slice (magnification×400).

Inflammation—Assay of IL-8

The assay of IL-8, pro-inflammatory cytokine (ng/ml) was performed from culture media by an immunoassay technique with spectrophotometric reading (λ450 nm) (ELISA kit, BioTechne).

Statistical Analysis

Mean values and standard deviations were calculated for n=3 (triplicate that is finally n=9). The normality of the samples of the control skin was verified using the Shapiro-Wilk test. If a p>0.05 was obtained, the group was considered normal and the comparison of the different parameters can be performed with the Student's test. If the group is not normal, Wilcoxon test was performed. In any case, p<0.05 was considered to be statistically significant.

Results: Quantification of Dendritic Cells (DC) in Epidermis (CD1a)

A significant increase of 104% in the number of dendritic cells was observed in the sensitive skin compared to the control skin. The application of 3% hydrophilic *Phaeodactylum Tricornutum* extract significantly reduced the number of dendritic cells by 32.6% compared to the sensitive skin. Thus, the hydrophilic *Phaeodactylum Tricornutum* extract seems to protect sensitive skin at the ex vivo level by reducing immune cells recruitment.

Results: Discomfort and Pain—TRPV1 Expression

The sensitive skin model significantly increased TRPV1 receptor expression in the epidermis by 29.1% compared to the control skin. The application of hydrophilic *Phaeodactylum Tricornutum* extract 3% reduced the expression of the TRPV1 receptor at the level of the epidermis in sensitive skin with an effect close to being significant (p value=0.052).

This shows at the ex vivo level that the hydrophilic *Phaeodactylum Tricornutum* extract is able to reduce the twinge's pain sensation, which is characteristic to sensitive skins.

Results IL-8 Assay

A significant increase of IL-8 secretion by 49.8% was observed in the sensitive skin compared to the control skin. The application of 3% hydrophilic *Phaeodactylum Tricornutum* extract significantly reduced the level of IL-8 by 26.4% (p value<0.01) compared to the sensitive skin.

The hydrophilic *Phaeodactylum Tricornutum* extract shows here its ability to reduce inflammatory response in ex vivo sensitive skin model.

Example 9

Monocytes Recruitment in Microfluidic System

Human umbilical vein endothelial cells (HUVECs) were cultured in chamber slides for 2-3 days and then treated for a further 10 hours with TNFalpha (tumor necrosis factor; 500 U/mL) or hydrophilic *Phaeodactylum Tricornutum* extract. Monocytes (85%-95%) were purified from citrated blood collected from two independent healthy donors (each done in triplicate) using a monocyte isolation kit (Miltenyi Biotec). The slides containing the cultured HUVEC monolayer were then attached to a flow chamber at 37° C. and flow generated over the HUVEC monolayer by perfusing wash buffer, or a monocyte suspension using a calibrated pump. The flow rate was representative of small venules (0.05 Pa).

The first stage of the assay was a washing procedure, where wash buffer was perfused over the HUVECs. Monocytes were then perfused over the activated HUVECs for 5 min followed by 55 min wash buffer. Images of the captured monocytes under flow were made using phase-contrast microscopy, and a high-resolution camera.

Individual images were recorded every 30 s and compiled into movie sequences, allowing analysis of individual monocytes over large areas. Monocytes adherent to the surface of the HUVECs have a phase-white appearance, whereas those that have transmigrated have a phase black appearance. Adhesion events were recorded as the total of number of cells per unit field (mm²). Transmigration events were presented as a percentage of total monocytes captured from flow per unit field. All experiments were carried out using triplicate fields and presented as a mean value with +standard error measurements (+SEM).

Four different concentrations of hydrophilic *Phaeodactylum Tricornutum* extract were tested: 0.5%, 1%, 3% and 10%.

Statistical analysis assumed parametric distributions, and was conducted using the Student T test. P values from significance scores are presented on figures as follows: *: p value<0.05; : p value<0.01; *: p value<0.005. (Bradfield et al., Blood, 2008).

Results:

Rates of primary monocyte transmigration under flow were comparable between the buffer control and hydrophilic *Phaeodactylum Tricornutum* extract at 0.5% for the two donors.

Increasing the concentration of hydrophilic *Phaeodactylum Tricornutum* extract on HUVECS reduced the transmigration in a dose dependent manner with a significant reduction observed at 1%, 3% and 10%.

The positive control M1/70 (anti-mac-1 antibody) significantly reduced monocytes transmigration (p value<0.001), validating this experiment.

These data confirm the previous observation from the ex vivo study, which means that the hydrophilic *Phaeodactylum Tricornutum* extract has a significant anti-inflammatory effect on TNF-α stimulated HUVECS by reducing monocytes recruitment.

Example 10

Anti-Microbial Property Through β-Defensin-2 Production Ex Vivo

Skin Explants Culture

Fresh human skin tissues derived from breast biopsy were disinfected with ethanol 70% and successive baths with antibiotics and antifungal agents. From these tissues, 6 mm biopsy punches were incubated in 12 mm inserts with 8 μm of porosity and sealed with 5 mg/ml Matrigel (Corning®). A specific medium for human skin tissue long-term survival was added in the bottom of each well to be in contact with the dermis, allowing the tissue to be in an air-liquid interface. Tissues were incubated overnight at 37° C., 5% $CO_2$.

Topical Treatment 3 to 5 tissue samples per condition from 3 independent donors (age 55, 60, and 66) were used for this second part. Following the overnight incubation, tissues were topically treated by applying 10 μl of solution on the epidermis:
1. Untreated: sterile PBS
2. *Phaeodactylum Tricornutum*: 3% (v/v) hydrophilic *Phaeodactylum Tricornutum* extract in sterile PBS Treatments were renewed every morning and evening for 3 days and medium was changed on Day 1 in the evening. Medium was then collected on Day 3 in the evening and stored at −20° C. until ELISA dosage.

β-Defensin-2 Quantification

Tissue culture medium was used to quantify β-Defensin-2 released by tissue samples with an Elisa assay. Briefly, supernatants were incubated in a 96-wells plate pre-coated with an anti-β-Defensin-2 antibody and incubated for 2 hours at room temperature under orbital agitation. After 4 washes with the assay buffer provided by the supplier, a biotinylated anti-human β-Defensin-2 antibody was added in each well and incubated for 2 hours at room temperature under agitation. After 4 further washes, a secondary antibody coupled with horseradish peroxidase (SA-HRP) was added in each well and incubated for 30 minutes at room temperature under agitation. Wells were washed 4 times again and 3,3',5,5'-Tetramethylbenzidine (TMB) substrate was added for 20 minutes in the dark under orbital agitation. Catalysis of TMB by HRP generated a blue coloration which was then stopped by addition of Stop Solution (HCl solution), completing the color changes from blue to yellow. Optical density was measured at 450 nm with a microplate reader.

Statistical Analysis

The normality of the samples was verified using the Shapiro-Wil test. If a p>0.05 is obtained, the group is considered normal and the comparison of the different parameters can be performed with the Student's test. If the group is not normal, Wilcoxon test was performed. Potential aberrant values were excluded only if the Dixon test confirmed that these values were significantly aberrant with a p<0.05.

In any case, p<0.05 is considered to be statistically significant.

Results

Hydrophilic *Phaeodactylum Tricornutum* extract at 3% for topically applied on skin explant twice a day for two days. Dosage in culture medium evidenced a significant increase of β-Defensin-2 release by +71% (p value<0.01), showing that a topical application of the hydrophilic *Phaeodactylum Tricornutum* extract is also able to improve skin anti-microbial defense.

Example 11

Soothing Activity (Clinical Study)

Tested Compositions (INCI)
  Placebo: AQUA/WATER, CETYL ALCOHOL, GLYCERYL STEARATE, PEG-75 STEARATE, CETETH-20, STEARETH-20 ISODECYL NEOPENTANOATE, PHENOXYETHANOL, METHYL PARABEN, PROPYL PARABEN, ETHYL PARABEN, DIMETHICONE, FRAGRANCE, HEXYL CINNAMAL, BUTYLPHENYL METHYLPROPIONAL, CITRONELLOL, ALPHA ISOMETHYL IONONE, HYDROXYISOHEXYL 3-CYCLOHEXENE CARBOXALDEHYDE
  Active: AQUA/WATER, CETYL ALCOHOL, GLYCERYL STEARATE, PEG-75 STEARATE, CETETH-20, STEARETH-20 ISODECYL NEOPENTANOATE, PHAEODACTYLUM TRICORNUTUM EXTRACT, PHENOXYETHANOL, METHYL PARABEN, PROPYL PARABEN, ETHYL PARABEN, DIMETHICONE, FRAGRANCE, HEXYL CINNAMAL, BUTYLPHENYL METHYLPROPIONAL, CITRONELLOL, ALPHA ISOMETHYL IONONE, HYDROXYISOHEXYL 3-CYCLOHEXENE CARBOXALDEHYDE Test Panel A double blind and placebo controlled clinical study was carried out on 20 volunteers (mean age: 46±9 years) matching the inclusion and exclusion criteria (Inclusion criteria: women aged between 30 and 60 years old. Exclusion criteria: pregnant or breast-feeding; dermatological problems and/or an allergy to cosmetic products; under medical treatment potentially capable of influencing the measured parameters). They were informed of the possible adverse effects from using the product and the technical conditions in which the assessment was performed. They willingly signed the consent form which was written in compliance with the Declaration of Helsinki and the Dec. 20, 1988 act of the Code de la Santé Publique.

The soothing activity was measured on forearm after irritation induction by 10% SLS patch. In this condition, the cream containing 3% hydrophilic *Phaeodactylum Tricornutum* extract or placebo was applied twice daily, and the a* parameter was followed after 7 days of treatment.

Chromameter Method

The measurement of skin color intensity was performed by colorimetry using a chromameter (Chromatique CM 2600d™ MINOLTA, France).

Color measurements were done with the following parameters:
1. Standard field of view of 2° as defined by the CIE in 1931
2. D65 illuminant corresponding to daylight
3. Measurement area of 8 mm
4. Color spaces used L*a*b* and L*C*h*

5. SCI method (specular included), allowing to free from surface condition.

The vertical dimension L* determines the brightness (or luminance) from zero (black) to 100 (white).

Parameter a* determines a range of 600 levels on the red axe (+299 positive values)→green (−300 negative values) through gray (0).

Parameter b* determines a range of 600 levels on the yellow axe (+299 positive values)→blue (−300 negative values) through gray (0).

Three successive measurements were carried out in three different places well marked on each volunteer. A control window enabled to reposition the devices on the area of interest. Parameters L*, a*, b* were recorded with the use of a software. Measurements were done rigorously on the same area.

Only a* parameter was analyzed during this study.

Results

In this study, 3 volunteers were excluded due to an excessive reaction to SLS patch and 2 other volunteers due to the absence of irritation induction by the SLS patch. As consequence, the statistical analysis was done on n=15 volunteers presenting a sensitive skin.

The soothing activity was evaluated on forearm after 7 days of SLS-mediated skin irritation. The a* parameter was measured in order to analyze the redness of the skin linked to the irritation.

The results are presented in the following table:

|  | Control | 3% Phaeodactylum Tricornutum | Placebo |
| --- | --- | --- | --- |
| D0 (Mean ± SD) | 5.72 ± 1.09 | 5.92 ± 1.27 | 5.77 ± 0.99 |
| D7 (Mean ± SD) | 7.41 ± 2.80 | 7.04 ± 1.63 | 7.89 ± 2.57 |
| Δ D0 -> D7 (%) | 30%* | 19%* | 37%** |

*p value < 0.05;
**p value < 0.01

It was observed that the SLS patch at 10% induced a skin irritation, as observed by the drastic increase of a* parameter. This effect was observed in all the conditions including control, placebo and 3% hydrophilic *Phaeodactylum Tricornutum* extract.

After 7 days of cream application containing 3% hydrophilic *Phaeodactylum Tricornutum* extract, a significant decrease of a* parameter versus DO was observed. The placebo showed inverse results, with a significant increase of a* parameter.

These results confirmed that the hydrophilic *Phaeodactylum Tricornutum* extract at 3% induced a significant reduction of skin redness and, thus a significant soothing effect. These results were significant relative to placebo with −18%.

Example 12

Stinging Test Using Capsaicin (Clinical Study)

Tested Compositions (INCI)
 Placebo: AQUA/WATER, CETYL ALCOHOL, GLYCERYL STEARATE, PEG-75 STEARATE, CETETH-20, STEARETH-20 ISODECYL NEOPENTANOATE, PHENOXYETHANOL, METHYL PARABEN, PROPYL PARABEN, ETHYL PARABEN, DIMETHICONE, FRAGRANCE, HEXYL CINNAMAL, BUTYLPHENYL METHYLPROPIONAL, CITRONELLOL, ALPHA ISOMETHYL IONONE, HYDROXYISOHEXYL 3-CYCLOHEXENE CARBOXALDEHYDE Active: AQUA/WATER, CETYL ALCOHOL, GLYCERYL STEARATE, PEG-75 STEARATE, CETETH-20, STEARETH-20 ISODECYL NEOPENTANOATE, PHAEODACTYLUM TRICORNUTUM EXTRACT, PHENOXYETHANOL, METHYL PARABEN, PROPYL PARABEN, ETHYL PARABEN, DIMETHICONE, FRAGRANCE, HEXYL CINNAMAL, BUTYLPHENYL METHYLPROPIONAL, CITRONELLOL, ALPHA ISOMETHYL IONONE, HYDROXYISOHEXYL 3-CYCLOHEXENE CARBOXALDEHYDE Test Panel A double blind and placebo controlled clinical study was carried out on two groups of 20 female volunteers each (mean age: 39±2 years) matching the inclusion and exclusion criteria (Inclusion criteria: 18-50 years old; sensitive skin based on capsaicin sensitivity test. Exclusion criteria: pregnant or breast-feeding; dermatological problems and/or an allergy to cosmetic products; under medical treatment potentially capable of influencing the measured parameters). They were informed of the possible adverse effects from using the product and the technical conditions in which the assessment is performed. They willingly signed the consent form which was written in compliance with the Declaration of Helsinki and the Dec. 20, 1988 act of the Code de la Santé Publique.

The volunteers were selected according to their capsaicin sensitivity. They applied twice daily a cream (placebo or containing 3% of hydrophilic *Phaeodactylum Tricornutum* extract) for 28 days.

Stinging Test Using Capsaicin

The concentration in capsaicin (in hydro-alcoholic solution) permits to evaluate the cutaneous sensitivity.

Concentrations used: C1=0.316 ppm; C2=1 ppm; C3=3.16 ppm; C4=10 ppm; C5=31.6 ppm.

On D0, the test was realized with the C1 to C3 concentrations of capsaicin. If no sensation was reported by the subject after the C3 concentration, they were not included in the study.

On D31, the test was realized with the C1 to C5 concentrations of capsaicin. If no sensation was reported by the subject after the C5 concentration, the last concentration was considered as the detection threshold for the subject.

The capsaicin test was conducted according to the following method:
 $1^{st}$ stage: The test areas (nasolabial folds) were cleansed using cotton pads impregnated with a hydro-alcoholic solution at 10% (vehicle solution) and were used five times over both test areas. The subjects were excluded from the study if they reported any sensation of discomfort at this stage of the test. If no, they continued the test.
 $2^{nd}$ stage: 2 minutes after the first stage, simultaneous split-face application of the vehicle solution over the nasolabial folds, with cotton buds (10 times). The subjects were excluded from the study if they reported any sensation of discomfort at this stage of the test. If no, they continued the test.
 $3^{rd}$ stage: 2 minutes after the $2^{nd}$ stage, a single-blind simultaneous split-face application of the vehicle and of capsaicin solution at concentration C1 was performed over the nasolabial folds with cotton buds (10 times). The sides of application of the capsaicin and control solutions were randomized.

The subjects were asked to report, during the three minutes following the application, any new sensation or any difference between the test areas, stating precisely the side, the nature (stinging, burning, itching, other) and the intensity using the following scale:
- 0: no sensation
- 1: doubtful, barely perceptible
- 2: slightly perceptible
- 3: moderately perceptible
- 4: strongly perceptible
- 5: painful The test was stopped as soon as the subject reported a sensation lasting more than 30 seconds on the side of capsaicin application, and the last tested concentration was considered as the detection threshold for the subject.

In the absence of any sensation or in the case of any sensation (irrespective of its intensity or duration) on the vehicle side or any sensation of less than 30 seconds on the capsaicin side, the test was continued, using the next higher dose of capsaicin solution and so on, in the increasing order of capsaicin concentration, until the capsaicin side was detected by the subject. A three-minute delay was respected before starting the next higher concentration (same application and testing method).

Results

The skin reactivity was analyzed on nasolabial fold using skin sensitivity to capsaicin test. The impact of the hydrophilic Phaeodactylum Tricornutum extract at 3% versus placebo after 28 days of twice daily application was analyzed.

An important improvement of skin reactivity to capsaicin after 28 days of application of cream containing the hydrophilic Phaeodactylum Tricornutum extract at 3% (+55%***) was observed, while the placebo showed a significant increase of 28%*. Also, the hydrophilic Phaeodactylum Tricornutum extract evidenced a significant difference relative to placebo, as shown in the table below. An improvement of skin reactivity was observed on 75% volunteers.

|  | Placebo | 3% Phaeodactylum Tricornutum |
| --- | --- | --- |
| D0 (Mean ± SD) | 2.2 ± 0.2 | 2.0 ± 0.2 |
| D28 (Mean ± SD) | 2.8 ± 0.2 | 3.1 ± 0.2 |
| Δ D0 -> D28 (%) | 28%* | 55%*** |

*p value < 0.05;
**p value < 0.01;
***p value < 0.001

Example 13

Protection of Skin Microbiota Composition (Clinical Study)

Tested Compositions (INCI)
Placebo: AQUA/WATER, CETYL ALCOHOL, GLYCERYL STEARATE, PEG-75 STEARATE, CETETH-20, STEARETH-20 ISODECYL NEOPENTANOATE, PHENOXYETHANOL, METHYL PARABEN, PROPYL PARABEN, ETHYL PARABEN, DIMETHICONE, FRAGRANCE, HEXYL CINNAMAL, BUTYLPHENYL METHYLPROPIONAL, CITRONELLOL, ALPHA ISOMETHYL IONONE, HYDROXYISOHEXYL 3-CYCLOHEXENE CARBOXALDEHYDE Active: AQUA/WATER, CETYL ALCOHOL, GLYCERYL STEARATE, PEG-75 STEARATE, CETETH-20, STEARETH-20 ISODECYL NEOPENTANOATE, PHAEODACTYLUM TRICORNUTUM EXTRACT, PHENOXYETHANOL, METHYL PARABEN, PROPYL PARABEN, ETHYL PARABEN, DIMETHICONE, FRAGRANCE, HEXYL CINNAMAL, BUTYLPHENYL METHYLPROPIONAL, CITRONELLOL, ALPHA ISOMETHYL IONONE, HYDROXYISOHEXYL 3-CYCLOHEXENE CARBOXALDEHYDE Test Panel A double blind and placebo controlled study was performed on 41 volunteers (average age of 39 years old) having sensitive skin. They were split into two groups who each applied twice daily a cream (placebo or containing 3% of hydrophilic Phaeodactylum Tricornutum extract) to their face for 28 days.

A microbiome clinical study (16S rRNA) was performed by swabbing volunteers' cheeks, extracting and sequencing the 16S rRNA gene (V3V4 region—paired-end sequencing technology) of all the volunteers, at D0 and D28. 11.3 billions of DNA bases were analyzed to compare the composition of the microflora population over time under the two conditions.

Results

It was found that cream containing the hydrophilic Phaeodactylum Tricornutum extract protects the diversity of skin microbiota, a key factor which can be linked to various inflammatory skin conditions when impacted: No significant modification of diversity was observed for the active at D28 on the Shannon index measurement (active: −6.5% with p value=0.216), while the diversity drastically decreased for the placebo (−12.8% with a p value<0.05).

Additionally, the hydrophilic Phaeodactylum Tricornutum extract was found to improve the microbiota composition, stabilizing Propionibacterium (now known as Cutibacterium) (active: +3.0%; vs. placebo: +15.5% with a p value<0.1) and significantly decreasing Corynebacterium populations (active: −32.4% with a p value<0.01; vs. placebo: −25.2% with a p value<0.1), both of which having been linked to proinflammatory features.

Thus, the hydrophilic Phaeodactylum Tricornutum extract acts on the skin microbiota to protect and improve its composition, rebalancing its equilibrium from sensitive skin to normal skin conditions.

Example 14

Analysis of Hydrophilic and Lipophilic Phaeodactylum Tricornutum Extracts

The hydrophilic Phaeodactylum Tricornutum extract of the present invention was found to have the following composition:
- Alanine, lactic acid, proline, glutamine, glycine betaine, asparagine: 26.5 wt %
- Glycerol, uridine, adenosine, guanosine: 16.0 wt %
- Cysteinolic acid: 10.3 wt %
- 2,3-dihydroxypropane-1-sulfonate: 9.3 wt %
- Thymidine: 6.6 wt %
- Glyceryl sulfoquinovoside: 5.4 wt %
- Free fatty acids and betain lipids: 4.3 wt %
- Unidentified components: 21.6 wt %

In contrast thereto, a lipophilic Phaeodactylum Tricornutum extract has the following composition:

Free fatty acids (of which 26 wt % Eicosapentaenoic acid=EPA): 96.2 wt %
Monoglycerides: 3.3 wt %
Diglycerides: 0.2 wt %
Triglycerides: 0.2 wt %

The above lipophilic *Phaeodactylum Tricornutum* extract is diluted in Mygliol 812 to obtain Megassane® (4.8% of lipophilic *Phaeodactylum Tricornutum* extract, 96.3% Mygliol 812, and 0.2% alpha-tocopherol).

Example 15

Comparison of Anti-Inflammatory Properties Using IL-8

The anti-inflammatory properties of hydrophilic and lipophilic *Phaeodactylum Tricornutum* extracts were compared by IL-8 quantification on ex vivo skin samples.

Materials and Methods

Human skin explants were obtained from abdominoplasty surgery on a female donor (51 years) and were maintained in culture with survival medium (Biopredic MIL217C) overnight at 37° C. in a humide atmosphere in the presence of 5% $CO_2$.

The following two products were tested:
0.03% (v/v) of hydrophilic *Phaeodactylum Tricornutum* extract (dry matter) diluted in PBS (phosphate buffered saline); and
0.03% (v/v) of lipophilic *Phaeodactylum Tricornutum* extract in Miglyol 812 N (Safic Alcan).

The skin explants were pre-incubated with either of the two products or left untreated for 24 h at 37° C. in a $CO_2$ incubator in humid atmosphere in the presence of survival medium.

The surface of skin explants was then washed twice with 200 μL of PBS and the inflammation induction was initiated by topical application of 10 μL SLS 1% (w/v) for 1 h at 37° C. The skin explants were then again washed twice with 200 μL of PBS and incubated for 2 h at 37° C.

The survival medium was removed and replaced by HBSS medium (Hanks' Balanced Salt solution, Gibco), followed by UVB irradiation at 2 $J/cm^2$ for the second step of inflammation induction. After UV exposure, the medium was eliminated and replaced by fresh survival medium and the respective product was again topically applied at 0.03% (w/v) for 24 h at 37° C. in a humid atmosphere in a $CO_2$ incubator.

After 24 h, the supernatants were collected and IL-8 production was quantified using ELISA assay according to the manufacturer's instruction (IL-8 D8000C R&D System).

Results

It was first confirmed that the treatment with SLS and UVB exposure induced a significant inflammation reaction as observed by the release of IL-8, a pro-inflammatory cytokine, which increased by +95% compared to the untreated condition (negative control).

The topical application of the hydrophilic *Phaeodactylum Tricornutum* extract significantly reduced the production IL-8 by −26%, while the lipophilic *Phaeodactylum Tricornutum* extract even led to a further increase. The results are shown in the following table:

|  |  | Mean IL-8 (ng/ml) |
|---|---|---|
| | Untreated | 2,305 ± 210 |
| 1% SLS treatment + 2 $J/cm^2$ UVB irradiation | No product | 48,010 ± 1,970 |
| | Hydrophilic Phaeodactylum Tricornutum extract | 35,350 ± 5,670 |
| | Lipophilic Phaeodactylum Tricornutum extract | 63,230 ± 3,460 |

These results clearly show that only the hydrophilic *Phaeodactylum Tricornutum* extract of the present invention has an anti-inflammatory activity as observed by the reduction of IL-8 release under inflammatory conditions, while the lipophilic *Phaeodactylum Tricornutum* extract of the state of the art does not.

The invention claimed is:

1. A method of treating sensitive skin, comprising the step of:
applying a cosmetic composition comprising a hydrophilic *Phaeodactylum tricornutum* extract to the skin, wherein the cosmetic composition comprises 1 to 10% v/v of the hydrophilic *Phaeodactylum tricornutum* extract, wherein the hydrophilic *Phaeodactylum tricornutum* extract is an aqueous extract of *Phaeodactylum tricornutum*.

2. The method of claim 1, wherein the application reduces redness in the sensitive skin.

3. The method of claim 1, wherein the application soothes the sensitive skin.

4. The method of claim 1, wherein the application reduces inflammation in the sensitive skin.

5. The method of claim 1, wherein the application improves the microbiota composition in sensitive skin.

6. The method of claim 1, wherein the cosmetic composition comprising the hydrophilic *Phaeodactylum tricornutum* extract is applied to facial skin.

7. The method of claim 1, wherein the cosmetic composition further comprises a cosmetically acceptable excipient.

8. The method of claim 1, wherein the cosmetic composition comprises 1 to 3% v/v of the hydrophilic *Phaeodactylum tricornutum* extract.

9. A method of treating sensitive skin, comprising the step of: topically applying a cosmetic composition comprising a hydrophilic *Phaeodactylum tricornutum* extract to the sensitive skin, wherein the hydrophilic *Phaeodactylum tricornutum* extract is an aqueous extract of *Phaeodactylum tricornutum*.

* * * * *